(12) United States Patent
Nakamura et al.

(10) Patent No.: US 6,270,906 B1
(45) Date of Patent: Aug. 7, 2001

(54) MONOLITHIC CERAMIC ELECTRONIC COMPONENT

(75) Inventors: Takanori Nakamura, Omihachiman; Tsuyoshi Yamana, Kyoto; Nobuyuki Wada; Takaharu Miyazaki, both of Shiga-ken, all of (JP)

(73) Assignee: Murata Manufacturing Co., Ltd. (JP)

(*) Notice: Subject to any disclaimer, the term of this patent is extended or adjusted under 35 U.S.C. 154(b) by 0 days.

(21) Appl. No.: 09/261,511

(22) Filed: Mar. 3, 1999

(30) Foreign Application Priority Data

Mar. 3, 1998 (JP) .................................................. 10-050537

(51) Int. Cl.$^7$ ................................ H01G 4/06; H01G 4/12
(52) U.S. Cl. ...................... 428/469; 428/472; 428/701; 428/702; 156/89.14; 361/313; 361/321.2
(58) Field of Search ..................... 428/469, 701, 428/702, 472; 361/311, 312, 313, 309, 308.1, 306.1, 306.3, 320, 321.1, 321.4, 321.5; 156/89.14

(56) References Cited

U.S. PATENT DOCUMENTS

| | | | |
|---|---|---|---|
| 4,388,346 | * | 6/1983 | Beggs et al. . |
| 5,734,545 | * | 3/1998 | Sano et al. . |
| 5,742,473 | * | 4/1998 | Sano et al. . |
| 5,757,610 | * | 5/1998 | Wada et al. . |
| 5,801,111 | * | 9/1998 | Wada et al. . |
| 5,815,368 | * | 9/1998 | Sakamoto et al. . |
| 5,835,340 | * | 11/1998 | Wada et al. . |
| 5,852,542 | * | 12/1998 | Wada et al. . |
| 5,877,934 | * | 3/1999 | Sano et al. . |
| 5,879,812 | * | 3/1999 | Nishiyama et al. . |
| 5,995,360 | * | 11/1999 | Hata et al. . |
| 6,002,577 | * | 12/1999 | Wada et al. . |
| 6,008,981 | * | 12/1999 | Harada et al. . |
| 6,051,516 | * | 4/2000 | Mizuno et al. . |

* cited by examiner

*Primary Examiner*—Deborah Jones
*Assistant Examiner*—Jennifer McNeil
(74) *Attorney, Agent, or Firm*—Ostrolenk, Faber, Gerb & Soffen, LLP

(57) ABSTRACT

A monolithic ceramic component has inner electrodes which are thin having a thickness of from about 0.2 $\mu$m to 0.7 min, and thereby, delamination is inhibited even though ceramic layers are thin, having a thickness up to about 3 $\mu$m. The mean particle size of the ceramic grains of the ceramic layers is up to 0.5 $\mu$m, so that the concavities and convexities at the interfaces between the inner electrodes and the ceramic layers can be reduced. Preferably, metal powder in a paste used to form the inner electrodes has a mean particle size of from about 10 to 200 nm, and thereby, the metal filling ratio and the smoothness of the inner electrodes can be enhanced, and the coverage can be improved.

19 Claims, 3 Drawing Sheets

MONOLITHIC CERAMIC ELECTRONIC COMPONENT

BACKGROUND OF THE INVENTION

1. Field of the Invention

The present invention relates to a monolithic ceramic electronic component such as a monolithic ceramic capacitor, and more particularly to an improvement in an inner electrode of the same.

2. Description of the Related Art

Conventionally, dielectric ceramic materials such as barium titanate, strontium titanate, calcium titanate, and the like, having a perovskite-type structure have been widely used as capacitor materials, due to their high dielectric constants. With the recent tendency that electronic components are small-sized, capacitors, which are passive components, are required to have a high electrostatic capacitance and also to be miniaturized.

For monolithic ceramic capacitors containing ceramic dielectric materials in their dielectric layers, it is necessary to bake the dielectric ceramic materials at high temperatures, for example, at about 1300° C. in the atmosphere. Therefore, as the inner electrodes, noble metals such as palladium, platinum, and the like, and their alloys were used. However, these electrode materials are very expensive, and the material cost occupied a large part of the product cost. Thus, it was difficult to reduce the product cost.

To solve the above-mentioned problems, it has been attempted to use base metals as a material for the inner electrodes of the monolithic ceramic capacitors. As a result, there have been developed a variety of dielectric ceramic materials which have such anti-reduction properties that they can be baked in a neutral or reducing atmosphere, which prevents the electrodes thereof from being oxidized. Such base metals as the inner electrode material include cobalt, nickel, copper, and the like. In the viewpoint of the cost and the anti-oxidation properties, nickel is mainly used.

At present, there is still a need to develop still smaller-sized and higher-capacitance monolithic ceramic capacitors. For this reason, investigation has been made on dielectric ceramic materials having a higher dielectric constant and on thinner ceramic layers made of dielectric ceramic materials. Furthermore, examination has been made on thinner electrodes.

In general, the inner electrodes of the monolithic ceramic capacitors are formed by printing, such as screen-printing, of pastes containing metal powders. For example, in most cases, nickel powders for use as the metal powder to be contained in such pastes, formed by liquid phase method or chemical vapor deposition method, have a mean particle size exceeding 0.25 $\mu$m. However, since the particle size is large, it is difficult to form the thin inner electrodes.

When the nickel powder having a mean particle size of about 0.25 $\mu$m were used, the thickness of the inner electrode was required to be at least 0.8 $\mu$m to realize the dielectric characteristics of the dielectric ceramic materials.

For the purpose of enhancing the electrostatic capacitance of the monolithic ceramic capacitors, one of the most effective means is to provide a thin ceramic layer between the inner electrodes. However, if the ceramic layer has a thickness of 3 $\mu$m or less when the inner electrodes each have a thickness of 0.8 $\mu$m, delamination is often caused due to the difference in shrinkage between the inner electrode material and the ceramic. This is one of fatal defects of the monolithic ceramic capacitors.

In the case that the nickel power and/or the ceramic raw material powder has a large mean particle size, large concavities and convexities at the interfaces between the inner electrodes and the ceramic layers are formed. When the powders are baked, this causes the problem that the coverage (effective electrode areas) of the inner electrodes is reduced (with an increase in the frequency of electrode breaking). Thus, this brings the reduction in reliability of the monolithic ceramic capacitor.

SUMMARY OF THE INVENTION

Accordingly, it is an object of the present invention to provide a monolithic ceramic electronic component such as a monolithic ceramic capacitor which has no structural defects, of which the inner electrodes and ceramic layers can be thinned, and which has high performances such as high capacitance, is small in size, and has a high reliability.

The present invention is intended for a monolithic ceramic electronic component equipped with a laminate including plural laminated ceramic layers each made of a sintered ceramic raw material powder layer, and an inner electrode made of a sintered metal powder and positioned along a predetermined interface between the ceramic layers. To solve such technical problems as described above, the monolithic ceramic electronic component is characterized in that the ceramic layers each have a thickness of up to about 3 $\mu$m, and the ceramic grains of said ceramic layers after sintering have a mean particle size of up to about 0.5 $\mu$m, and the inner electrode has a thickness of from about 0.2 $\mu$m to 0.7 $\mu$m.

Preferably, according to the present invention, the monolithic ceramic electronic component further contains an outer electrode formed on the respective opposite end faces of the laminate, the ceramic layer is made of a ceramic dielectric material and the plural inner electrodes are so formed that one edge of each inner electrode is exposed out of one of the end faces of the laminate with the outer electrode electrically connected with the exposed inner electrodes, whereby a monolithic ceramic capacitor is formed.

Preferably, according to the present invention, a paste containing the metal powder is used to form the inner electrode, the metal powder in the paste has a thickness of from about 10 nm to 200 nm. In this case, as the metal powder, a base metal, more preferably, powder made of a metal containing nickel such as nickel or a nickel alloy is used.

Preferably, according to the invention, the paste containing the metal powder is applied by printing to form the inner electrodes.

According to the present invention, it is preferable that the ceramic raw material powder before sintering to form the ceramic layers has a mean particle size of up to about 500 nm.

DESCRIPTION OF THE PREFERRED EMBODIMENT

Figure 1:
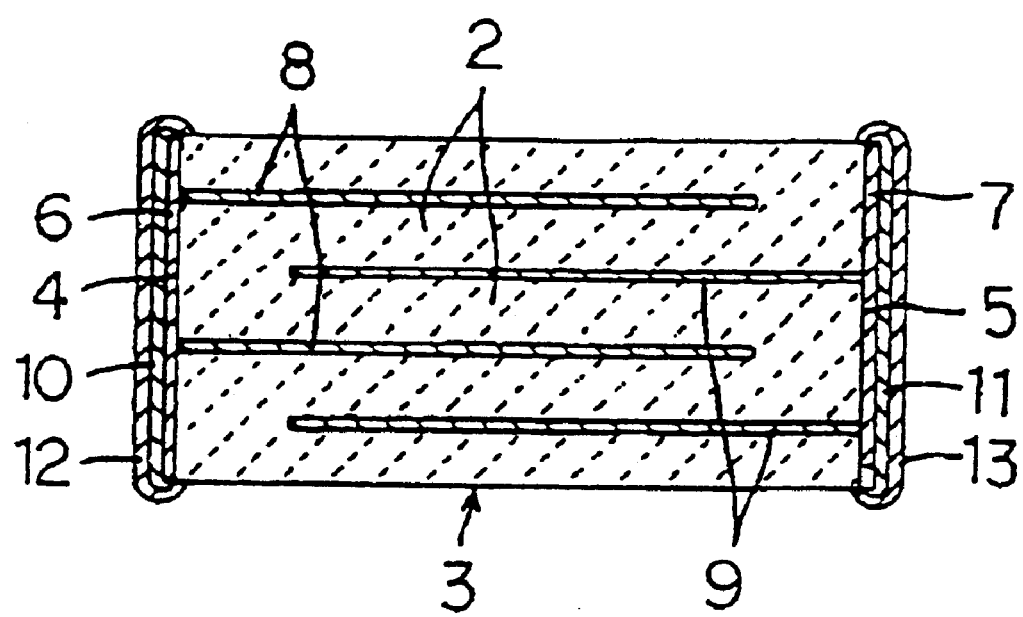
FIG. 1 is a sectional view of a monolithic ceramic capacitor 1 according to an embodiment of the present invention.

Hereinafter, a monolithic ceramic capacitor 1 having a structure as shown in FIG. 1, in accordance with an embodiment of the present invention will be described.

Referring to FIG. 1, a monolithic ceramic capacitor includes a laminate 3 containing ceramic layers 2 composed of plural laminated ceramic dielectric materials, and first and second outer electrodes 6 and 7 provided on a first end face 4 and a second end face 5 of the laminate 3, respectively. The monolithic ceramic capacitor 1 constitutes a chip type electronic component having a rectangular parallelepiped shape as a whole.

First inner electrodes 8 and second inner electrodes 9 are alternately embedded in the laminate 3. Each of the first inner electrodes 8 is formed along a predetermined interface of the ceramic layers 2 while one side edge of the first inner electrodes 8 is so exposed to the first end face 4 that the first inner electrodes 8 is electrically connected to the outer electrodes 6. Each of the second inner electrodes 9 is formed along a predetermined interface of the ceramic layers 2 while one side edge of the second inner electrodes 9 is so exposed to the second end face 5 that the second inner electrode 9 is electrically connected to the outer electrodes 7.

For the purpose of producing the monolithic ceramic capacitor 1, a ceramic raw material powder such as barium titanate or the like as a major raw material, and additives for modification of characteristics are prepared as starting raw materials. As the ceramic raw material powder, preferably, a powder having a mean particle size of up to about 500 nm, adjusted by controlling the calcination temperature, is used. The reason will be described later.

Predetermined amounts of the ceramic raw material powder and the additives are weighed, and mixed by the wet mixing-system to form a mixed powder. Particularly, each additive component in the form of its oxide powder or carbonate powder is added to and mixed with the ceramic raw material powder by the wet mixing system. In this case, each additive may be converted to an alkoxide or a compound such as an acetyl acetonate or a metal soap so that it is made soluble in an organic solvent. A solution containing the respective additives may be applied to the surfaces of the ceramic raw material powder and then heat treated.

Succeedingly, an organic binder and a solvent are added to the above-described mixed power to prepare a ceramic slurry. With the ceramic slurry, a ceramic green sheet to constitute each ceramic layer 2 is formed. The thickness of the ceramic green sheet is so set that the thickness after baking is up to about 3 $\mu$m.

Then, on the ceramic green sheet, an electro-conductive past film to constitute the inner electrodes 8 and 9 is formed by printing such as screen printing or the like. The thickness of the conductive paste film is so set that the thickness after baking is in the range of from about 0.2 to 0.7 $\mu$m.

The paste to form the above conductive paste film contains metal powder, a binder and a solvent. Preferably, the metal power having a mean particle size of from about 10 to 200 nm is used. The reason will be described later. For example, the paste containing Ni powder, an ethyl cellulose binder and a solvent such as terpineol or the like is used. The paste is prepared by means of a three-roll mill or the like, in order to deflocculate the Ni powder having a mean particle size of from about 10 to 200 nm or prevent the powder from being flocculated and disperse the powder sufficiently.

The above-described metal powder, more particularly the Ni powder, can be prepared favorably by chemical vapor deposition, hydrogen arc discharging or in-gas evaporation method.

Referring to chemical vapor deposition, nickel chloride is heated so as to be evaporated, and the generated nickel chloride vapor, while it is carried by an inert gas, is brought into contact with hydrogen at a predetermined temperature to react, whereby the nickel power is formed. The nickel power is collected by cooling the reaction gas containing the nickel powder.

The hydrogen arc discharge method involves arc-discharging in an environment containing hydrogen gas to melt and evaporate nickel fine powder. From the gaseous phase, nickel fine powder is formed. More particularly, a gas containing hydrogen or non-oxidative hydrogen-containing compound or a mixed gas of the above gas with an inert gas such as Ar, He, Xe or the like is introduced into a reactor where a heater utilizing arc, plasma, or the like is placed, to produce a mixed gas atmosphere. The hydrogen or the non-oxidative hydrogen-containing compound in the atmosphere is easily activated (excitation, decomposition, dissociation, ionization, and the like) under heat caused with the arc or the plasma. The resultant active species (excited hydrogen molecules, hydrogen molecule ions, hydrogen atoms, hydrogen atom ions, free radical ions, and the like) positively react with the nickel melted under the heat caused by the arc or plasma, and are dissolved into the melted nickel. When the hydrogen is dissolved into the melted nickel in an amount higher than the supersaturation amount (more than the saturation quantity at the equilibrium), the hydrogen is released from the melted nickel. In this case, a high temperature state is locally generated, which promotes the evaporation of the nickel, that is, the nickel vapor is released. The nickel vapor is condensed and cooled to produce the nickel fine powder.

The in-gas evaporation method involves heating a nickel ingot with a heating means such as by a high frequency induction heating means or the like in a vessel having an inert gas (Ar, He, Xe or the like) filled therein. The heating is maintained until a nickel vapor is produced. The produced nickel vapor is brought into contact with an inert gas contained in the atmosphere causing the Ni to be cooled and solidified, so that the nickel fine powder is produced.

Plural green sheets containing the ceramic green sheets having the conductive paste films formed thereon as described above are laminated, pressed, and cut, if necessary. Thus, the laminate 3 in its green state is formed in which the plural ceramic green sheets and the plural conductive past films to constitute the inner electrodes 8 and 9 formed along predetermined interfaces between the ceramic green sheets are laminated, and the conductive paste films to constitute the inner electrodes 8 and 9 have their side edges exposed to the end faces 4 and 5.

Then, the laminate 3 is baked in a reducing atmosphere. In this case, the laminate is such that the mean particle size of the ceramic grains constituting the ceramic layers 2 as measured after they are sintered is up to about 0.5 $\mu$m. The reason will be described later.

Succeedingly, the first and second outer electrodes 6 and 7 are formed on the first and second side faces 4 and 5 of the laminate 3 in such a manner that the outer electrodes are electrically connected to the side edges of the first and second inner electrodes 8 and 9 in the baked laminate 3.

The material composition for the outer electrodes 6 and 7 has no particular limitations. More particularly, the same materials as those for the inner electrodes 8 and 9 are available. In addition, for example, the outer electrodes 6 and 7 may be made of sintering layers of a variety of electroconductive metal powders such as Ag, Pd, Ag—Pd, Cu, Cu alloys, or the like, or may be made of sintering layers of the above conductive metal powders compounded with glass frits made of the type of $B_2O_3$—$Li_2O$—$SiO_2$—$BaO$, $B_2O_3$—$SiO_2$—$BaO$, $Li_2O$—$SiO_2$—$BaO$, $B_2O_3$—$SiO_2$—$ZnO$, or the like. The material composition for the outer electrodes 6 and 7 is properly selected, depending on use, use-sites, and the like of the monolithic ceramic capacitor 1.

The outer electrodes 6 and 7 may be formed by applying a paste containing a metal powder as the material of the outer electrodes 6 and 7 onto the laminate 3 after baking and then baking, as described above. The outer electrodes 6 and 7 may be formed by applying the paste onto the laminate 3 before baking, and then simultaneously baking the paste and the laminate 3.

Thereafter, the outer electrodes 6 and 7 are coated with plating layers 10 and 11 made of Ni, Cu, an Ni—Cu alloy, or the like, respectively, if necessary. Furthermore, on the plating layers 10 and 11, second plating layers 12 and 13 made of solder, tin or the like may be formed.

According to the present invention, the ranges of the thickness of the inner electrodes 8 and 9, the mean particle size of the ceramic grains after sintering and constituting the ceramic layer 2, and the thickness of the ceramic layers 2 are defined. Further, the preferable ranges of the mean particle sizes of the Ni powder contained in the paste to form the inner electrodes 8 and 9, and the ceramic raw material powder before sintering to form the ceramic layer 2, are defined. In this specification, the term "mean particle size" means the 50% particle corresponding size ($D_{50}$) of the particle size distribution on a number basis, determined by the image analysis of an electron microscopic photograph of the powder or grains.

According to the present invention, the thickness of the inner electrodes 8 and 9 is defined to be up to about 0.7 $\mu$m. One of the reason lies in that when the ceramic layers 2 are thin, for example, have a thickness of up to 3 $\mu$m, the inner electrodes 8 and 9 containing nickel and the ceramic layer 2 cannot avoid their delamination caused by the difference in shrinkage between them.

In the other words, when the inner electrodes 8 and 9 have a thickness of up to about 0.7 $\mu$m, the thickness of the ceramic layers 2 can be set at about 3 $\mu$m or lower without troubles. This contributes to the large capacitance monolithic ceramic capacitor 1.

In addition, the thickness of the inner electrodes 8 and 9 is defined to be at least about 0.2 $\mu$m. This is because when the thickness is less than about 0.2 $\mu$m, the nickel contained in the inner electrodes 8 and 9 reacts with the ceramic contained in the ceramic layer 2 when the calcination is carried out causing the oxidation of the nickel and the delamination due to the oxidation. Thus, the inner electrodes can not achieve their functions.

Further, the mean particle size of the ceramic grains after sintering and constituting the ceramic layer 2 is defined to be up to about 0.5 $\mu$m. The reason is as follows. When the mean particle size of the ceramic grains is up to about 0.5 $\mu$m, concavities and convexities at the interface between the inner electrodes 8 and 9 and the ceramic layer 2 are reduced in size. This effect decreases the electrode breaking of the inner electrodes 8 and 9, increases the coverage (effective electrode area) of the electrodes, and inhibits the electric field concentration applied to the concavities and convexities at the interface. These facts contribute to the prolonged life time as measured by the high temperature loading test. Thus, the reliability of the monolithic ceramic capacitor is enhanced.

The mean particle size of the Ni powder contained in the paste to be used for the inner electrodes 8 and 9 is defined to be preferably from about 10 to 200 nm. The reason is as follows.

If the mean particle size of the Ni powder is less than about 10 nm, it is difficult to prepare the paste having a viscosity applicable for the printing such as screen printing. Even if the screen printing is carried out with the paste having such a high viscosity, the conductive paste films to constitute the inner electrodes 8 and 9 can be so formed as to have a high smoothness with much difficulty. Defects of "scratching" and pinholes are caused, which may bring the reduction of the coverage and the electrode breaking.

On the other hand, if the mean particle size of the Ni powder exceeds about 200 nm, it is difficult to form the conductive past films with a high smoothness to constitute the inner electrodes 8 and 9, so that the coverage is reduced. Further, there are the concavities and convexities at the interfaces between the inner electrodes 8 and 9 and the ceramic layer 2.

The mean particle size of the ceramic raw material powder before sintering to constitute the ceramic layers is defined to be preferably up to about 500 nm. This is because when the mean particle size of the ceramic raw material powder is up to about 500 nm, the ceramic filling ratio in the green sheet is enhanced, and the smoothness of the green sheet is increased, so that the ceramic layer having a thickness of up to about 3 $\mu$m can be formed without problems.

By selecting not only the above-described preferable range of the mean particle size of the Ni powder contained in the paste to constitute the inner electrodes 8 and 9 but also the preferable range of the mean particle size of the ceramic raw material powder before sintering to constitute the ceramic layer 2, further advantageous results of coverage, reliability, and the like can be obtained.

In the above-described embodiment, the monolithic ceramic capacitor as the monolithic ceramic electronic component is described. However, the present invention may be applied to other types of monolithic ceramic electronic component such as a multi-layer ceramic substrate and the like, having substantially the same structure as the monolithic ceramic capacitor.

As the metal powder contained in the paste to constitute the inner electrodes, powders of nickel alloys, other base metals such as copper or copper alloys, and noble metal are available, in addition to the above-described nickel powder.

EXAMPLE

Hereinafter, the present invention will be described with reference to specific examples in detail. It is to be understood that the practicable mode of the present invention, not departing from the scope of the present invention, is not restricted on the following example. For example, as dielectric ceramics in the example, only a barium titanate type is exemplified. However, it has been demonstrated that the same advantages as those of the barium titanate type can be obtained by use of dielectric ceramics having a perovskite-type structure and containing as a major component strontium titanate, calcium titanate, and the like.

A monolithic ceramic capacitor 1 having such a structure as shown in FIG. 1 was prepared in the example.

1. Preparation of Sample

First, barium titanate ($BaTiO_3$) powder as the ceramic raw material powder was prepared by the hydrolyzation method. The $BaTiO_3$ powder was calcined at different calcination temperatures listed in Table 1 to prepare types of ($BaTiO_3$) powder A–E with different mean particle sizes ($D_{50}$) ranging 0.1–0.8 µm.

TABLE 1

| Type of $BaTiO_3$ Powder | Mean Particle Size (µm) | Calcination Temperature (° C.) |
|---|---|---|
| A | 0.1 | 800 |
| B | 0.2 | 950 |
| C | 0.3 | 1050 |
| D | 0.5 | 1100 |
| E | 0.8 | 1150 |

Next, to the above-described $BaTiO_3$ powders A–E, additives ($\alpha Dy + \beta Mg + \gamma Mn$ and Si sintering-assisting agent) in the form of carbonate powder shown in Table 2 were added in different amounts by mole parts and mixed. Thus, several types of ceramic compositions were prepared.

TABLE 2

| Type of Ceramic Composition | $BaTiO_3 + \alpha Dy + \beta Mg + \gamma Mn$ | | | | Addition Amount of Si Sintering Assisting Agent (Parts by Mole) |
|---|---|---|---|---|---|
| | Type of $BaTiO_3$ Powder | Addition Amount (Parts by Mole) of Additive | | | |
| | | α | β | γ | |
| Aa | A | 0.02 | 0.0200 | 0.005 | 3 |
| Ab | A | 0.02 | 0.0005 | 0.005 | 3 |
| Ba | B | 0.02 | 0.0200 | 0.005 | 3 |
| Ca | C | 0.02 | 0.0200 | 0.005 | 3 |
| Cb | C | 0.02 | 0.0005 | 0.010 | 4 |
| Da | D | 0.02 | 0.0200 | 0.005 | 3 |
| Db | D | 0.02 | 0.0005 | 0.005 | 6 |
| Ea | E | 0.02 | 0.0200 | 0.020 | 3 |
| Eb | E | 0.02 | 0.0005 | 0.005 | 6 |

In the "type of ceramic composition" column of Table 2, the reference characters having an affix of "a" (for example, Aa) represent the type of ceramic presenting no grain-growth when it is sintered. In this case, the ceramic particle sizes after sintering are substantially the same as those of the raw material powders. The reference characters having an affix of "b" (for example, Ab) represent the type of ceramics presenting a ready grain-growth when they are sintered. In this case, the mean particle sizes of the ceramic grains become higher than those of the raw material powders.

To each of the barium titanate ceramic compositions shown in Table 2, a polyvinylbutyral type binder and an organic solvent of ethanol or the like were added and wet-mixed with a ball mill to prepare a ceramic slurry. Then the ceramic slurry was formed into a ceramic green sheet by doctor blade method. In this case, the slit width of the doctor blade was adjusted to prepare the ceramic green sheets with a thickness of 4.2 µm or 1.4 µm. The thicknesses of 4.2 µm and 1.4 µm of the ceramic green sheets correspond to those of 3 µm and 1 µm of the ceramic layers, respectively, after their subjection to lamination and baking processes, as seen in the results and evaluation described later.

Separately, spherical-particle Ni powders with the different mean particle sizes of 5 nm, 15 nm, 50 nm, 100 nm, 180 nm and 250 nm were prepared. More particularly, the Ni powders with the mean particle sizes of 5 nm and 15 nm were prepared by the above-described in-gas evaporation method, and the powders of 50 nm and 100 nm and those of 180 nm and 250 nm in mean particle size were prepared by the hydrogen arc discharge method and the chemical vapor deposition, respectively.

Next, to 42 wt. % of the respective Ni powders, 44 wt. % of an organic vehicle prepared by dissolving 6 wt. % of an ethyl cellulose type binder in 94 wt. % of terpineol, and 14 wt. % of terpineol were added and sufficiently mixed to be dispersed by means of a three-roll mill. Thus, the paste containing the Ni powder sufficiently dispersed therein was prepared.

Onto the above-described ceramic green sheets, the Ni pastes were screen-printed. In this case, the samples of 1.2 µm, 1.0 µm, 0.6 µm, 0.3 µm and 0.15 µm in thickness as measured after the conductive paste films were dried were prepared. The thicknesses 1.2 µm, 1.0 µm, 0.6 µm, 0.3 µm, and 0.15 µm as measured after the conductive paste films were dried correspond to the thicknesses of 0.8 µm, 0.7 µm, 0.4 µm, 0.2 µm and 0.1 µm of the inner electrode after the lamination and baking, correspondingly.

A plurality of the ceramic green sheets were so laminated into plural layers that the above-described conductive paste films were exposed to the alternate side-faces of the laminate, and pressed under heating to be integrated. Then the integral, pressed body was cut into a predetermined size to obtain a raw chip in the form of a raw laminate. The raw chip was heated at a temperature of 300° in an $N_2$ atmosphere to burn the binder, and baked in a reducible atmosphere constituted of $H_2$—$N_2$—$H_2O$ gas at an oxygen partial pressure of $10^{-9}$ to $10^{-12}$ MPa according to the profiles that the respective raw chips are held at a maximum baking temperature in the range of from 1100 to 1300° C. listed in the columns of "Baking Temperature" in Tables 3, 4, and 5 below for two hours.

After baking, onto both the opposite side-faces of the laminate, a silver paste containing glass frits made of the $B_2O$—$Li_2O$—$SiO_2$—$BaO$ type was coated, and baked in an $N_2$ atmosphere at a temperature of 600° C. to prepare outer electrodes electrically connected to the inner electrodes.

The outside dimensions of the monolithic ceramic capacitor thus obtained were 5.0 mm wide, 5.7 mm long and 2.4 mm thick. The thickness of the ceramic layers interposed between the inner electrodes was 3 µm or 1 µm. The number of the effective dielectric ceramic layers was 5, and the area of the opposed electrodes per one layer was $16.3 \times 10^{-6}$ m$^2$,

2. Evaluation of Samples

The respective samples of the monolithic ceramic capacitors thus obtained were evaluated on their lamination structures, electric characteristics, and reliability.

To determine the mean particle sizes of the ceramic grains after sintering, constituting the ceramic layers of the monolithic ceramic capacitors, polished sections of the monolithic ceramic capacitors were chemically etched and observed with a scanning electron microscope.

Also, to determine the thickness of the inner electrodes and the ceramic layers, the polished sections of the monolithic ceramic capacitors were observed with a scanning electron microscope.

As regards the delamination of the monolithic ceramic capacitors, sections of the samples were polished and observed with a microscope to be visually evaluated. Determined was the ratio (delamination occurrence ratio) of the number of samples exhibiting the delamination based on the total number of the tested Samples.

To quantitatively determine the coverage (area covered with an electrode) of the inner electrodes, the inner electrodes were released from the sample, and the state that the formed empty holes were photographed with a microscope and evaluated by image analyzing the photograph.

The samples evaluated on their structures to be good were tested on the following electric characteristics:

The electrostatic capacitance (C) and the dielectric loss (tan δ) were determined according to JIS Standard No. 5102 by means of an automatic bridge type measure. The dielectric constant (E) was calculated from the measured electrostatic capacitance.

For high moisture load test, the time-dependent change of the insulation resistance of each sample was determined while a direct current voltage of 10 kV/mm was applied at a temperature of 150° C. The time at which the insulation resistance (R) of the sample reduced to $10^5 \Omega$ or lower is taken as the time when the sample failed. The mean life time of the samples, that is, the mean value of time-periods until the samples failed was determined.

The results thus obtained are shown in Tables 3, 4, and 5. The conditions of the samples with the sample numbers having an affix of "*" depart from the scope of the present invention.

3. Thickness of Inner Electrode and Mean Particle size of Ni powder

Table 3 below shows the relationship between the thickness of the inner electrodes and the delamination occurrence ratio of the described-below samples having a ceramic layer thickness of 3 μm or 1 μm and being different in thickness of the inner electrodes. That is, the above samples were made from the ceramic composition incapable of grain-growing, represented by reference character Ba in the column "Type of Ceramic Composition" of Table 2, containing the $BaTiO_3$ powder having a mean particle size of 0.2 μm, represented by reference character B in the column "Type of $BaTiO_3$ powder" of Table 1, and exhibiting a mean ceramic particle size after sintering of 0.2 μm.

TABLE 3

| | Structure of Monolithic Capacitor | | | Characteristics of Material | | | Laminate Structure Evaluation | | Evaluation of Electric Characteristics | | |
|---|---|---|---|---|---|---|---|---|---|---|---|
| | | | | | $BaTiO_3$ | | | | | | |
| Sample No. | Thickness of Ceramic (μm) | Thickness of Electrode (μm) | Mean Particle Size of Grain (μm) | Ni Mean Particle Size (nm) | Powder Average Particle Size (nm) | Baking Temperature (° C.) | Delamination Occurrence Ratio (%) | Coverage (%) | ε | tan δ (%) | Mean Life Time (Time) |
| *1 | 3 | 0.8 | 0.2 | 250 | 200 | 1150 | 80 | 76 | — | — | — |
| *2 | 3 | 0.8 | 0.2 | 180 | 200 | 1150 | 100 | 85 | — | — | — |
| *3 | 3 | 0.8 | 0.2 | 50 | 200 | 1150 | 90 | 98 | — | — | — |
| *4 | 3 | 0.8 | 0.2 | 15 | 200 | 1150 | 100 | 98 | — | — | — |
| 5 | 3 | 0.7 | 0.2 | 250 | 200 | 1150 | 0 | 40 | 1070 | 2.1 | 58 |
| 6 | 3 | 0.7 | 0.2 | 180 | 200 | 1150 | 0 | 65 | 1620 | 2.4 | 65 |
| 7 | 3 | 0.7 | 0.2 | 50 | 200 | 1150 | 0 | 92 | 1840 | 2.4 | 105 |
| 8 | 3 | 0.4 | 0.2 | 100 | 200 | 1150 | 0 | 86 | 1850 | 2.5 | 102 |
| 9 | 3 | 0.4 | 0.2 | 15 | 200 | 1150 | 0 | 82 | 1810 | 2.5 | 82 |
| 10 | 3 | 0.2 | 0.2 | 100 | 200 | 1150 | 0 | 73 | 1720 | 2.6 | 81 |
| 11 | 3 | 0.2 | 0.2 | 50 | 200 | 1150 | 0 | 84 | 1820 | 2.6 | 92 |
| 12 | 3 | 0.2 | 0.2 | 15 | 200 | 1150 | 10 | 62 | 1730 | 2.9 | 72 |
| 13 | 3 | 0.2 | 0.2 | 5 | 200 | 1150 | 10 | 58 | 1180 | 3.2 | 59 |
| *14 | 3 | 0.1 | 0.2 | 50 | 200 | 1150 | 80 | 67 | — | — | — |
| *15 | 3 | 0.1 | 0.2 | 15 | 200 | 1150 | 90 | 91 | — | — | — |
| *16 | 3 | 0.1 | 0.2 | 5 | 200 | 1150 | 100 | 96 | — | — | — |
| *17 | 1 | 0.8 | 0.2 | 250 | 200 | 1150 | 100 | 74 | — | — | — |
| *18 | 1 | 0.8 | 0.2 | 180 | 200 | 1150 | 90 | 81 | — | — | — |
| *19 | 1 | 0.8 | 0.2 | 50 | 200 | 1150 | 90 | 95 | — | — | — |
| *20 | 1 | 0.8 | 0.2 | 15 | 200 | 1150 | 100 | 82 | — | — | — |
| 21 | 1 | 0.7 | 0.2 | 250 | 200 | 1150 | 0 | 45 | 1200 | 2.2 | 68 |
| 22 | 1 | 0.7 | 0.2 | 180 | 200 | 1150 | 0 | 60 | 1520 | 2.3 | 62 |
| 23 | 1 | 0.7 | 0.2 | 50 | 200 | 1150 | 0 | 90 | 1850 | 2.4 | 100 |
| 24 | 1 | 0.4 | 0.2 | 100 | 200 | 1150 | 0 | 79 | 1740 | 2.5 | 98 |
| 25 | 1 | 0.4 | 0.2 | 15 | 200 | 1150 | 0 | 80 | 1790 | 2.5 | 85 |
| 26 | 1 | 0.2 | 0.2 | 100 | 200 | 1150 | 0 | 71 | 1720 | 2.6 | 78 |
| 27 | 1 | 0.2 | 0.2 | 50 | 200 | 1150 | 0 | 85 | 1790 | 2.6 | 91 |
| 28 | 1 | 0.2 | 0.2 | 15 | 200 | 1150 | 0 | 66 | 1680 | 2.8 | 68 |
| 29 | 1 | 0.2 | 0.2 | 5 | 200 | 1150 | 10 | 57 | 1250 | 3.2 | 62 |
| *30 | 1 | 0.1 | 0.2 | 50 | 200 | 1150 | 80 | 67 | — | — | — |
| *31 | 1 | 0.1 | 0.2 | 15 | 200 | 1150 | 100 | 91 | — | — | — |
| *32 | 1 | 0.1 | 0.2 | 5 | 200 | 1150 | 100 | 96 | — | — | — |

In Table 3, in Sample Nos. 1 through 4 and 17 through 20, each having an affix of "*", the inner electrode thickness is 0.8 μm. Delamination occurs at a high ratio. In Samples 14 through 16 and 30 through 32 each having an affix of "*", the inner electrode thickness is 0.1 μm. In this case, delamination also occurs at a high ratio. In Samples 14 through 16 and 30 through 32, the delamination is due to the oxidation of nickel.

On the other hand, when the inner electrode thickness is in the range of from 0.2 to 0.7 μm as in Sample Nos. 5 through 13 and 21 through 29, delamination never or scarcely occurs.

As seen in the above-described results, when the ceramic layer thickness is up to about 3 μm, the inner electrode thickness range where the delamination can be prevented or inhibited is from about 0.2 to 0.7 μm.

Hereinafter, the characteristics, especially the mean particle size of the nickel powder with which the inner electrode thickness can be set be in the range of from about 0.2 to 0.7 μm will be discussed below.

In Sample Nos. 5 and 21, the nickel powder mean particle size is 250 nm. The coverage and the produced capacitance are reduced. In Sample Nos. 13 and 29, the nickel powder mean particle size is 5 nm. In this case, the coverage and the produced capacitance are also reduced.

On the other hand, as seen in Sample Nos. 6 through 12 and 22 through 28, when the mean particle size of the nickel powder is adjusted to be in the range of from 10 to 200 nm, one can be assured of lessening the reduction in coverage and producing a high electrostatic capacitance.

As seen in the above-described results, when the inner electrode thickness is in the range of from about 0.2 to 0.7 μm, structural defects such as delamination and the like can be eliminated even though the monolithic ceramic capacitor has a ceramic film thickness of up to 3 μm. To assure less reduction of the coverage and the high electrostatic capacitance, the mean particle size of the nickel powder is preferably in the range of about 10 from 200 nm.

4. Mean Particle size of Grains for Ceramic Composition Presenting No Grain-Growth Table 4 below shows the relationship between the thickness of the inner electrodes and the delamination occurrence ratios of the described-below samples, which are different in mean particle sizes of the ceramic grains after sintering and constituting the ceramic layers of the monolithic ceramic capacitors, that is, being 0.1 μm, 0.3 μm, 0.5 μm and 0.8 μm in thickness, and having a ceramic layer thickness of 3 μm or 1 μm. The above-samples were made from the ceramic compositions represented by reference characters Aa, Ca, Da, and Ea in the column "Type of Ceramic Composition" of Table 2 incapable of grain-growing, containing the $BaTiO_3$ powders having mean grains sizes of 0.1 μm, 0.3 μm, 0.5 μm and 0.8 μm represented by reference characters A, C, D, and E in the column "Type of $BaTiO_3$ powder" of Table 1, respectively.

TABLE 4

| Sample No. | Type of Ceramic | Structure of Monolithic Capacitor | | | Characteristics of Material | | | Laminate Structure Evaluation | | Evaluation of Electric Characteristics | | |
|---|---|---|---|---|---|---|---|---|---|---|---|---|
| | | Thickness of Ceramic (μm) | Thickness of Electrode (μm) | Mean Particle Size of Grain (μm) | Ni Mean Particle Size (nm) | $BaTiO_3$ Powder Average Particle Size (nm) | Baking Temperature (° C.) | Delamination Occurrence Ratio (%) | Coverage (%) | ε | tan δ (%) | Mean Life Time (Time) |
| *41 | Ea | 3 | 0.8 | 0.8 | 180 | 800 | 1300 | 100 | 92 | — | — | — |
| 42 | | 3 | 0.7 | 0.8 | 180 | 800 | 1300 | 0 | 62 | 1560 | 2.5 | 22 |
| 43 | | 3 | 0.2 | 0.8 | 50 | 800 | 1300 | 0 | 72 | 1740 | 2.9 | 33 |
| 44 | Da | 3 | 0.4 | 0.5 | 100 | 500 | 1250 | 0 | 85 | 1810 | 2.4 | 82 |
| *45 | | 3 | 0.1 | 0.5 | 15 | 500 | 1250 | 80 | 68 | — | — | — |
| *46 | Ca | 3 | 0.8 | 0.3 | 50 | 300 | 1200 | 90 | 95 | — | — | — |
| 47 | | 3 | 0.7 | 0.3 | 180 | 300 | 1200 | 0 | 64 | 1600 | 2.4 | 84 |
| 48 | | 3 | 0.2 | 0.3 | 50 | 300 | 1200 | 0 | 80 | 1790 | 2.6 | 94 |
| 49 | Aa | 3 | 0.4 | 0.1 | 100 | 100 | 1100 | 0 | 94 | 1840 | 2.4 | 102 |
| *50 | | 3 | 0.1 | 0.1 | 15 | 100 | 1100 | 80 | 75 | — | — | — |
| *51 | Ea | 1 | 0.8 | 0.8 | 180 | 800 | 1300 | 100 | 89 | — | — | — |
| 52 | | 1 | 0.7 | 0.8 | 180 | 800 | 1300 | 0 | 60 | 1530 | 2.4 | 7 |
| 53 | | 1 | 0.2 | 0.8 | 50 | 800 | 1300 | 0 | 62 | 1720 | 2.8 | 8 |
| 54 | Da | 1 | 0.4 | 0.5 | 100 | 500 | 1250 | 0 | 82 | 1790 | 2.4 | 54 |
| *55 | | 1 | 0.1 | 0.5 | 15 | 500 | 1250 | 90 | 64 | — | — | — |
| *56 | Ca | 1 | 0.8 | 0.3 | 50 | 300 | 1200 | 100 | 97 | — | — | — |
| 57 | | 1 | 0.7 | 0.3 | 180 | 300 | 1200 | 0 | 61 | 1600 | 2.4 | 7.8 |
| 58 | | 1 | 0.2 | 0.3 | 50 | 300 | 1200 | 0 | 81 | 1790 | 2.5 | 92 |
| 59 | Aa | 1 | 0.4 | 0.1 | 100 | 100 | 1100 | 0 | 89 | 1820 | 2.4 | 100 |
| *60 | | 1 | 1.1 | 0.1 | 15 | 100 | 1100 | 100 | 69 | — | — | — |

In Table 4, as in the samples shown in Table 3 incorporated above, in Sample Nos. 41, 46, 51, and 56 each having an affix of "*", the inner electrode thickness is 0.8 μm. Delamination occurs at a high ratio. In Sample Nos. 45, 50, 55, and 60 each having an affix of "*" as well, have an inner electrode thickness of 0.1 μm, the delamination also occurs at a high ratio. In Sample Nos. 45, 50, 55, and 60, the delamination is due to the oxidation of nickel.

On the other hand, as seen in Sample Nos. 42 through 44, 47 through 49, 52 through 54, and 57 through 59, when the inner electrode thickness is in the range of from about 0.2 to 0.7 μm, delamination does not occur.

As seen in the above-described results, when the ceramic layer thickness is up to about 3 μm, the inner electrode thickness range where the delamination can be prevented or inhibited is from about 0.2 to 0.7 μm.

As regards the samples listed in Table 4, there is found the following tendency. If the ceramic raw material powders and the grains are large in size, even though the mean particle sizes of the ceramic raw material powders are in the range of 100 to 800 nm, and the average particle size is in the range of 0.1 to 0.8 μm, the concavities and convexities at the interfaces between the inner electrodes and the ceramic layers become large, and thereby the mean life times is shortened. Particularly, when the mean particle size of the ceramic raw material powder is 800 nm and the mean particle size of the grains is 0.8 μm, the mean life time is relatively short, that is, less than 50 hours.

On the other hand, as seen in Samples Nos. 44, 47 through 49, 54, and 57 through 59, when the mean particle size of the grains is up to 0.5 μm, the reliability is enhanced, for example, the mean life time is 50 hours or higher.

As seen in the above-described results, when the inner electrode thickness is in the range of from about 0.2 to 0.7 μm, the delamination can be eliminated even though the monolithic ceramic capacitor has a ceramic film thickness of up to about 3 μm. When the mean particle size of the grains is up to about 0.5 μm, the mean life time can be prolonged.

5. Mean Particle size for Ceramic Composition Capable of Readily Grain-Growing Table 5 below shows the relationship between the thickness of the inner electrodes and the delamination occurrence ratios of the described-below samples, which are different in mean particle size of the ceramic grains after sintering and constituting the ceramic layers of the monolithic ceramic capacitors, in the range of 0.2 to 1.0 μm, given by controlling the baking temperature, and have a ceramic layer thickness of 3 μm or 1 μm. The above samples were made from the ceramic compositions represented by Ab, Cb, Db, and Eb in the column "Type of Ceramic Composition" of Table 2 capable of readily grain-growing and containing the BaTiO₃ powders having mean particle sizes of 0.1 μm, 0.3 μm, 0.5 μm and 0.8 μm represented by reference characters A, C, D, and E in the column "Type of BaTiO₃ powder" of Table 1.

TABLE 5

| Sample No. | Type of Ceramic | Structure of Monolithic Capacitor | | | Characteristics of Material BaTiO₃ | | | Laminate Structure Evaluation | | Evaluation of Electric Characteristics | | |
|---|---|---|---|---|---|---|---|---|---|---|---|---|
| | | Thickness of Ceramic (μm) | Thickness of Electrode (μm) | Mean Particle Size of Grain (μm) | Ni Mean Particle Size (nm) | Powder Average Particle Size (nm) | Baking Temperature (°C.) | Delamination Occurrence Ratio (%) | Coverage (%) | ε | tan δ (%) | Mean Life Time (Time) |
| *61 | Eb | 3 | 0.8 | 1.0 | 180 | 800 | 1300 | 80 | 61 | — | — | — |
| 62 | | 3 | 0.2 | 1.0 | 50 | 800 | 1300 | 0 | 65 | 1250 | 3.4 | 20 |
| 63 | Db | 3 | 0.7 | 0.7 | 100 | 500 | 1250 | 0 | 75 | 1800 | 2.8 | 23 |
| 64 | | 3 | 0.2 | 0.7 | 15 | 500 | 1250 | 0 | 65 | 1720 | 2.4 | 28 |
| *65 | Cb | 3 | 0.8 | 0.5 | 180 | 300 | 1200 | 100 | 96 | — | — | — |
| 66 | | 3 | 0.7 | 0.5 | 250 | 300 | 1200 | 10 | 42 | 850 | 2.3 | 68 |
| 67 | | 3 | 0.4 | 0.5 | 180 | 300 | 1200 | 0 | 62 | 1540 | 2.4 | 70 |
| 68 | | 3 | 0.2 | 0.5 | 50 | 300 | 1200 | 0 | 81 | 1740 | 2.6 | 80 |
| *69 | | 3 | 0.1 | 0.5 | 50 | 300 | 1200 | 100 | 46 | — | — | — |
| 70 | Ab | 3 | 0.7 | 0.2 | 100 | 100 | 1100 | 0 | 92 | 1810 | 2.4 | 98 |
| 71 | | 3 | 0.2 | 0.2 | 5 | 100 | 1100 | 0 | 45 | 890 | 2.4 | 80 |
| *72 | | 3 | 0.1 | 0.2 | 15 | 100 | 1100 | 80 | 50 | — | — | — |
| 73 | | 3 | 0.4 | 1.0 | 100 | 100 | 1250 | 0 | 72 | 1680 | 2.4 | 30 |
| 74 | | 3 | 0.2 | 1.0 | 15 | 100 | 1250 | 0 | 62 | 1560 | 2.7 | 28 |
| *75 | Eb | 1 | 0.8 | 1.0 | 180 | 800 | 1300 | 90 | 60 | — | — | — |
| 76 | | 1 | 0.2 | 1.0 | 50 | 800 | 1300 | 0 | 62 | 1010 | 3.5 | 5 |
| 77 | Db | 1 | 0.7 | 0.7 | 100 | 500 | 1250 | 0 | 71 | 1740 | 2.7 | 10 |
| 78 | | 1 | 0.2 | 0.7 | 15 | 500 | 1250 | 0 | 62 | 1720 | 2.3 | 12 |
| *79 | Cb | 1 | 0.8 | 0.5 | 180 | 300 | 1200 | 100 | 84 | — | — | — |
| 80 | | 1 | 0.7 | 0.5 | 250 | 300 | 1200 | 10 | 42 | 750 | 2.4 | 62 |
| 81 | | 1 | 0.4 | 0.5 | 180 | 300 | 1200 | 0 | 60 | 1520 | 2.3 | 68 |
| 82 | | 1 | 0.2 | 0.5 | 50 | 300 | 1200 | 0 | 78 | 1650 | 2.7 | 75 |
| *83 | | 1 | 0.1 | 0.5 | 50 | 300 | 1200 | 90 | 62 | — | — | — |
| 84 | Ab | 1 | 0.7 | 0.2 | 100 | 100 | 1100 | 0 | 85 | 1770 | 2.4 | 92 |
| 85 | | 1 | 0.2 | 0.2 | 5 | 100 | 1100 | 0 | 42 | 720 | 2.6 | 76 |
| *86 | | 1 | 0.1 | 0.2 | 15 | 100 | 1100 | 100 | 50 | — | — | — |
| 87 | | 1 | 0.4 | 1.0 | 100 | 100 | 1250 | 0 | 70 | 1720 | 2.4 | 7 |
| 88 | | 1 | 0.2 | 1.0 | 15 | 100 | 1250 | 0 | 62 | 1520 | 2.6 | 2 |

In Table 5, in Sample Nos. 61, 65, 75, and 79 each having an affix of "*", the inner electrode thickness is 0.8 μm, and delamination occurs at a high ratio, as well as the above-described samples shown in Tables 3 and 4. In addition, in Sample Nos. 69, 72, 83, and 86 each having an affix of "*", the inner electrode thickness is 0.1 μm, and delamination occurs at a high ratio as well. In Sample Nos. 69, 72, 83, and 86, the delamination is due to the oxidation of nickel.

On the other hand, as seen in Sample Nos. 62 through 64, 66 through 68, 70, 71, 73, 74, 76 through 78, 80 through 82, 84, 85, 87 and 88, when the inner electrode thickness is in the range of from 0.2 to 0.7 μm, no delamination occurs.

As seen in the above description, when the ceramic layer thickness is up to about 3 μm, the inner electrode thickness range where the delamination can be prevented or inhibited is from about 0.2 μm to 0.7 μm.

The mean particle sizes of the ceramic raw material powders of the samples shown in Table 5 are in the range of from 100 to 800 nm, and the mean particle size of the grains are in the range of from 0.2 to 1.0 μm. As regards the samples each shown in Table 5 and of which the mean particle size of the raw material powder and the particle size are large, the concavities and convexities at the interfaces between the inner electrodes and the ceramic layers are great in size. For this reason, there is found a tendency that the mean life time is short.

Particularly, in Sample Nos. 62 through 64, 73, 74, 76 through 78, 87, and 88, the mean particle size of the grains is at least 0.7 μm. Of these samples, in Sample Nos. 62 and 76, the mean particle size of the ceramic raw material powder is already large, namely, 800 nm. In Sample Nos. 63, 64, 73, 74, 77, 78, 87, and 88, though the mean particle size of the ceramic raw material powder is up to 500 nm, and the mean particle size of the grains is at least 0.7 μm. Especially, in Sample Nos. 73, 74, 87, and 88, though the mean particle size of the ceramic raw material powder is small, namely, 100 μm, the mean particle size of the grains is increased to 1.0 μm by raising the baking temperature to 1250° C. When the mean particle size of the grains is 0.7 μm or larger, irrespective of the mean particle size of the ceramic raw material powder, the mean life time is short, namely, less than 50 hours.

On the other hand, as seen in Sample Nos. 66 through 68, 70, 71, 80 through 82, 84, and 85, when the mean particle size of the ceramic raw material powder is less than 500 nm, namely, 300 nm or 100 nm, and also the mean particle size of the grains is 0.5 μm or smaller, there is found the tendency that the reliability is enhanced, that is, the mean life time is longer than 50 hours.

In Sample Nos. 66 and 80, the mean particle size of the nickel powder is 250 nm, and the coverage and the obtained capacitance are reduced. In Sample Nos. 71 and 85, the mean particle size of the nickel powder is 5 nm, but in this case, the coverage and the obtained capacitance are reduced as well.

On the other hand, in Sample Nos. 62 through 64, 67, 68, 70, 73, 74, 76 through 78, 81, 82, 84, 87, and 88, high electrostatic capacitance can be assured, due to the mean particle size of the nickel powder in the range of from 10 to 200 nm.

As seen in the above-described results, when the inner electrode thickness is in the range of from about 0.2 to 0.7 μm, delamination can be inhibited even in the case of the monolithic ceramic capacitors each having a ceramic layer thickness of up to about 3 μm. In addition, even though the grain-growth of the ceramics occurs, the mean life time can be prolonged on condition that the mean particle size of the grains is up to about 0.5 μm. When the mean particle size of the nickel powder to be used for the inner electrodes is in the range of from about 10 to 200 nm, the electrostatic capacitance of each of the monolithic ceramic capacitors is enhanced and the reduction in the coverage is lessened.

6. Scanning Electron Microscopic Photograph of Monolithic Ceramic Capacitor Cross-Section FIGS. 2 and 3 are photographs showing the polished cross-sections of the monolithic ceramic capacitors taken with a scanning electron microscope.

Figure 2:
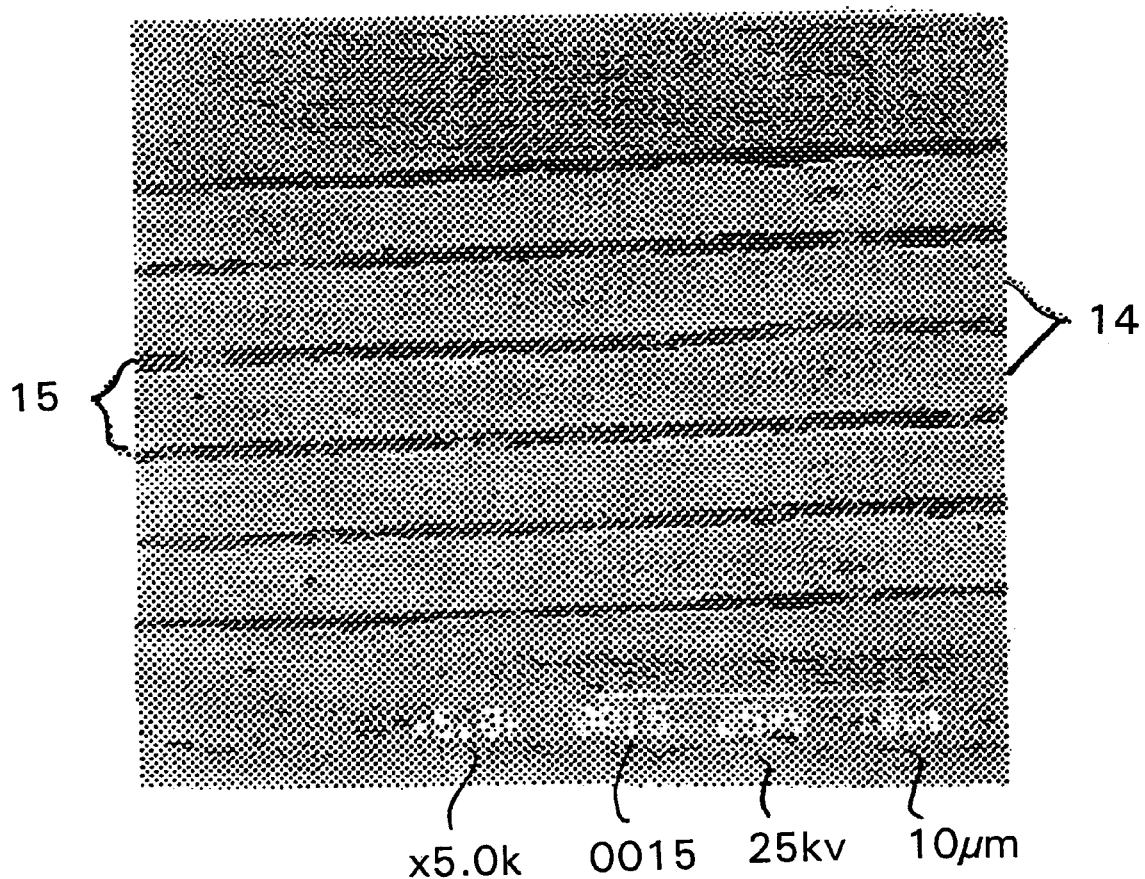
FIG. 2 is a photograph showing a cross-section of a monolithic ceramic capacitor according to a more concrete example of the present invention, taken by scanning electron microscopy.
Figure 3:
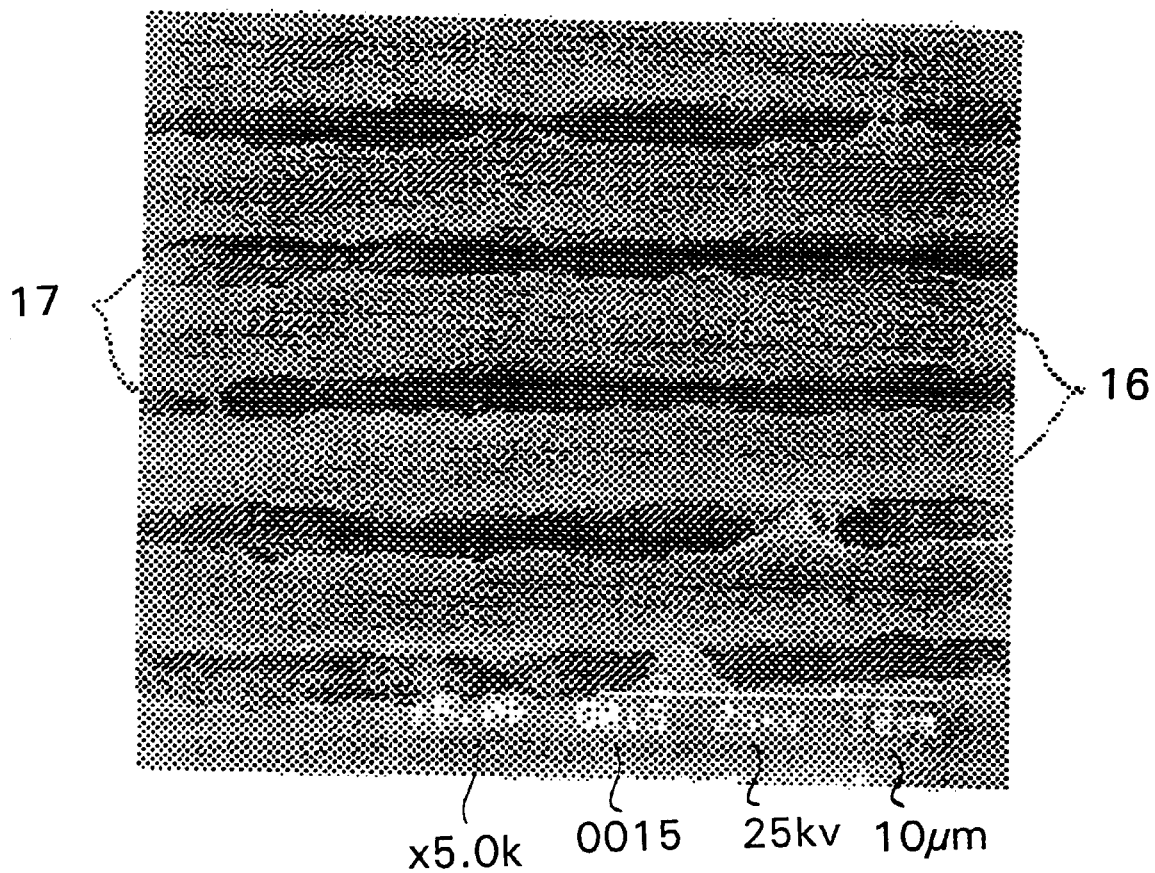
FIG. 3 is a photograph showing a cross-section of a conventional monolithic ceramic capacitor, by scanning electron microscopy.

FIG. 2 shows a monolithic ceramic capacitor according to the present invention. In this photograph, there are shown plural ceramic layers 14 and inner electrode layers 15 lying along the interfaces between the ceramic layers 14. FIG. 3 shows a conventional monolithic ceramic capacitor, in which there appear plural ceramic layers 16 and inner electrodes 17 provided along the interfaces between the ceramic layers 16.

The above-mentioned inner electrode layers 15 and 17 containing nickel and formed in the monolithic ceramic capacitors were removed by etching with copper (II) chloride prior to photographing so that cavities were left.

For the monolithic ceramic capacitor of the present invention, shown in FIG. 2, the ceramic layers 14 each have a set thickness of 2.0 μm, and the inner electrodes (inner electrode layers 15) each have a set thickness of 0.5 μm. In the case of the conventional monolithic ceramic capacitor shown in FIG. 3, the ceramic layers 16 each have a set thickness of 2.5 μm, and the inner electrodes (inner electrode layers 17) each have a set thickness of 1.4 μm.

As seen in FIG. 2, in the monolithic ceramic capacitor according to the present invention, the concavities and convexities at the interfaces between the inner electrodes (inner electrode layers 15) and the ceramic layers 14) are small, and no breaking of the electrodes occurs, though the inner electrodes (inner electrode layers 15) each are thin, namely, a thickness of 0.5 μm.

On the other hand, in the conventional monolithic ceramic capacitor shown in FIG. 3, the concavities and convexities at the interfaces between the inner electrodes (inner electrode layers 17 and the ceramic layers 16) are relatively large, and breaking of the electrodes occurs, though the inner electrodes (inner electrode layers 17) each are thin, namely, a thickness of 1.4 μm. Further, the delamination occurs in the conventional monolithic ceramic capacitor, though not clearly shown in the photograph of FIG. 3.

As seen in the above description, according to the present invention, the inner electrodes each have a thickness of from about 0.2 μm to 0.7 μm. Therefore, if the ceramic layers each is thin, namely, has a thickness of up to about 3 μm, the delamination of the ceramic electronic component can be inhibited. In the case that the present invention is applied to the monolithic ceramic capacitor, the inhibition of delamination is much effective in realizing the small-sized and high capacitance monolithic ceramic capacitor.

According to the present invention, the ceramic grains after sintering and constituting the ceramic layers have a mean ceramic particle size of up to about 0.5 μm. Therefore, the concavities and convexities at the interfaces between the inner electrodes and the ceramic layers are small, and thereby, the concentration of electric fields can be inhibited, the mean life time as measured by high temperature load test or the like can be prolonged, and the reliability can be enhanced.

Preferably, according to the present invention, a paste containing the metal powder to form the inner electrodes is used, and the metal powder of the paste having a mean particle size of from about 10 nm to 200 nm is used. In this case, the filling density and the smoothness of the metal powder in the inner electrodes are improved, and thereby, is obtained such a high coverage as can sufficiently realize electric characteristics, for example, the dielectric characteristics of the ceramic constituting the ceramic layers, even though the inner electrodes each are thin, namely, have a thickness of from about 0.2 to 0.7 μm, as described above. Thus, the inner electrodes can satisfactorily achieve their functions. To form the inner electrodes, printing method such as screen printing or the like can be applied without trouble. Thus, a process for forming the inner electrodes can be efficiently carried out.

Preferably, as the above-described metal powder, powder of a base metal is used. This serves for the material cost reduction. As the base metal, a metal containing nickel may be used. In this case, high anti-oxidation properties can be expected as compared with the case where copper or the like is used.

Preferably, according to the present invention, the ceramic raw material powder before sintering to form the ceramic layers has a mean particle size of up to about 500 nm. In this case, the ceramic filling ratio and the smoothness of the ceramic layers are enhanced. Thus, the thin ceramic layers each having a thickness of up to about 3 μm can be formed without trouble.

What is claimed is:

1. A monolithic ceramic electronic component comprising a laminate of a plurality of sintered ceramic powder layers, and at least one inner electrode of sintered metal powder positioned along an interface between two of said ceramic layers, wherein each said ceramic layer has a thickness of up to about 3 $\mu$m and the ceramic grains of said ceramic layer have a mean particle size of up to about 0.5 $\mu$m, and wherein said inner electrode has a thickness of from about 0.2 $\mu$m to 0.7 $\mu$m.

2. A monolithic ceramic electronic component according to claim 1, wherein said component further contains two outer electrodes disposed at different areas of the external surface of said laminate, each ceramic layer comprises a ceramic dielectric, and there are a plurality of inner electrodes disposed such that at least one inner electrode is electrically connected to each outer electrode, whereby a monolithic ceramic capacitor is formed.

3. A monolithic ceramic electronic component according to claim 2, wherein said metal is a base metal.

4. A monolithic ceramic electronic component according to claim 3, wherein said base metal comprises nickel.

5. A monolithic ceramic electronic component according to claim 4, wherein said ceramic dielectric comprises barium titanate.

6. A monolithic ceramic electronic component according to claim 1, wherein said metal is a base metal.

7. A monolithic ceramic electronic component according to claim 6, wherein said base metal comprises nickel.

8. A monolithic ceramic electronic component according to claim 7, wherein said ceramic dielectric comprises barium titanate.

9. A monolithic ceramic electronic component according to claim 1, wherein said ceramic dielectric comprises barium titanate.

10. A method of forming the monolithic ceramic electronic component according to claim 1 comprising the steps of providing a ceramic raw material green sheet which after sintering will have a thickness of up to about 3 $\mu$m with ceramic grains of a mean particle size of up to about 0.5 $\mu$m, and having on a surface thereof a paste comprising a metal powder which has a thickness of from about 10 nm to 200 nm, wherein said inner electrode has a thickness of from about 0.2 $\mu$m to 0.7 $\mu$m, and sintering said green sheet.

11. A method of forming a monolithic ceramic electronic component according to claim 10, comprising the step of applying said paste to said green sheet by printing.

12. A method of forming a monolithic ceramic electronic component according to claim 10, wherein said ceramic raw material is a powder having a mean particle size of up to 500 nm.

13. A method of forming a monolithic ceramic electronic component according to claim 12, wherein said metal is a base metal.

14. A method of forming a monolithic ceramic electronic component according to claim 13, wherein said base metal comprises nickel.

15. A method of forming a monolithic ceramic electronic component according to claim 14, wherein said ceramic raw material comprises barium titanate.

16. A method of forming a monolithic ceramic electronic component according to claim 10, wherein said metal is a base metal.

17. A method of forming a monolithic ceramic electronic component according to claim 16, wherein said base metal comprises nickel.

18. A method of forming a monolithic ceramic electronic component according to claim 17, wherein said ceramic raw material comprises barium titanate.

19. A method of forming a monolithic ceramic electronic component according to claim 10, wherein said ceramic raw material comprises barium titanate powder having a mean particle size of up to 500 nm.

* * * * *